(No Model.) 3 Sheets—Sheet 1.

W. J. CONROY.
ENSILAGE HARVESTER AND CHOPPER.

No. 465,127. Patented Dec. 15, 1891.

WITNESSES:
C. Sedgwick
E. M. Clark

INVENTOR:
W. J. Conroy
BY Munn & Co.
ATTORNEYS

THE NORRIS PETERS CO., PHOTO-LITHO., WASHINGTON, D. C.

(No Model.) 3 Sheets—Sheet 2.

W. J. CONROY.
ENSILAGE HARVESTER AND CHOPPER.

No. 465,127. Patented Dec. 15, 1891.

WITNESSES:
C. Sedgwick
E. M. Clark

INVENTOR:
W. J. Conroy
BY Munn & Co.
ATTORNEYS (No Model.) 3 Sheets—Sheet 3.

W. J. CONROY.
ENSILAGE HARVESTER AND CHOPPER.

No. 465,127. Patented Dec. 15, 1891.

WITNESSES:
C. Sedgwick
E. M. Clark

INVENTOR:
W. J. Conroy
BY Munn & Co.
ATTORNEYS

UNITED STATES PATENT OFFICE.

WILLIAM J. CONROY, OF AYLMER, CANADA.

ENSILAGE HARVESTER AND CHOPPER.

SPECIFICATION forming part of Letters Patent No. 465,127, dated December 15, 1891.

Application filed April 15, 1891. Serial No. 388,962. (No model.)

*To all whom it may concern:*

Be it known that I, WILLIAM J. CONROY, of Aylmer, in the Province of Quebec and Dominion of Canada, have invented a new and Improved Ensilage Harvester and Chopper, of which the following is a full, clear, and exact description.

My invention relates to an improved ensilage harvester and chopper, and has for its object to provide a machine which when drawn over a field containing standing fodder will harvest or mow the fodder, cut it up into pieces of required size, and deliver the chopped material to a cart or other receptacle following the harvester.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
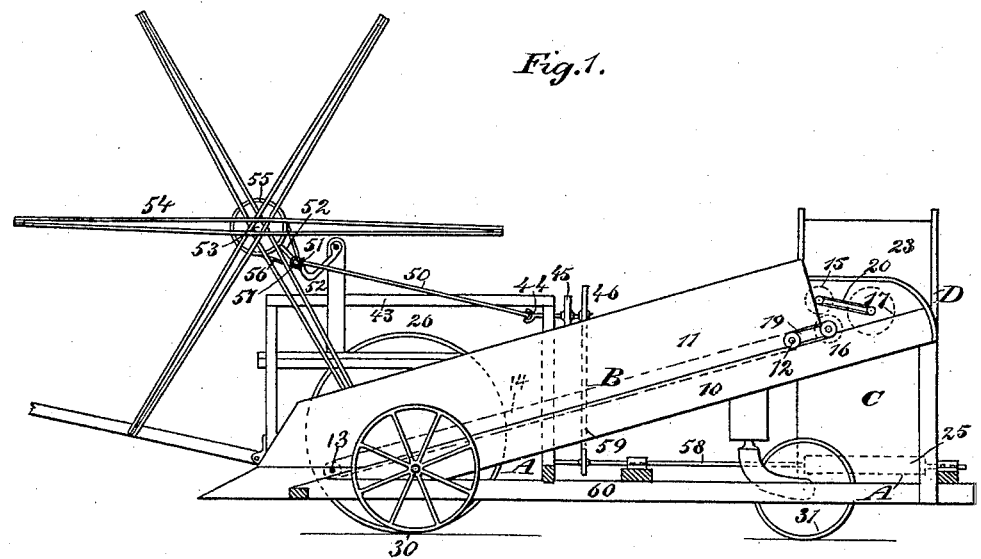
Figure 2:
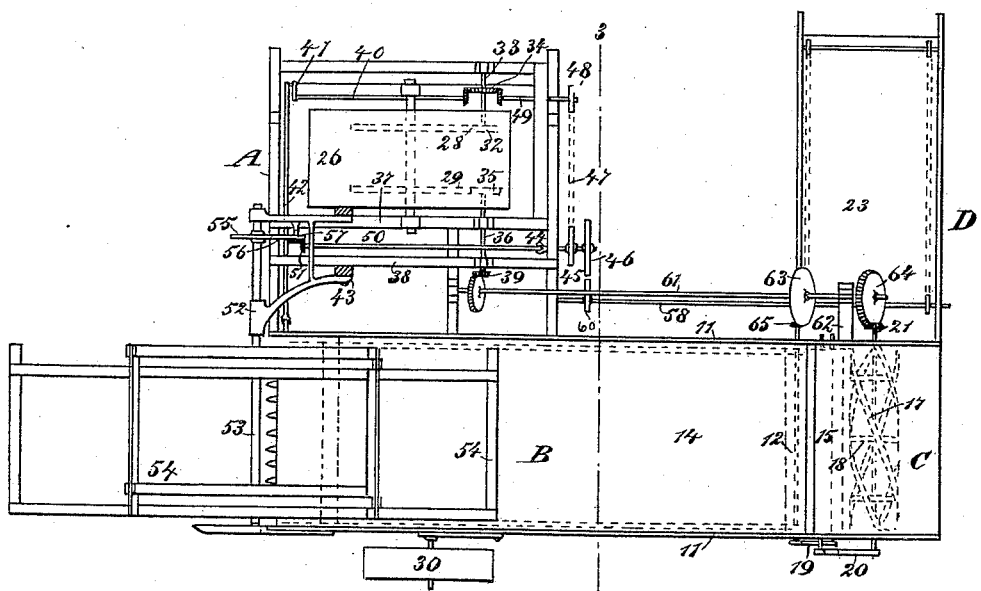
Figure 3:
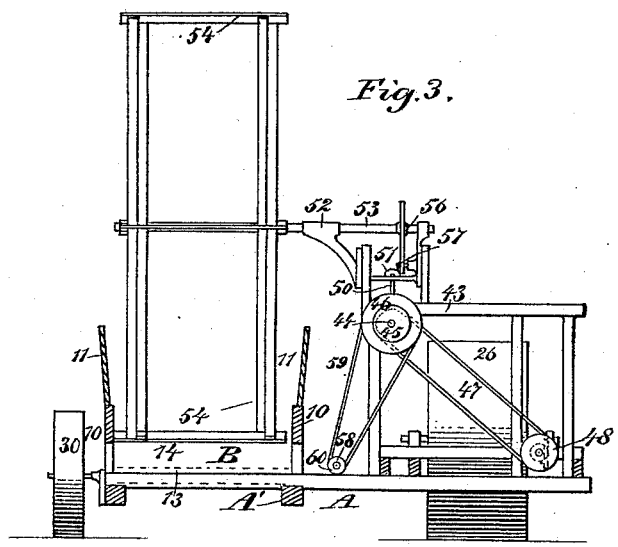
Figure 4:
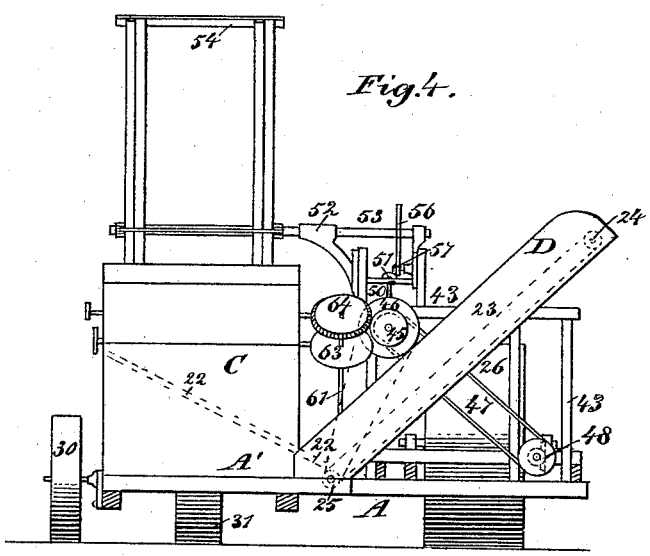
Figure 5:
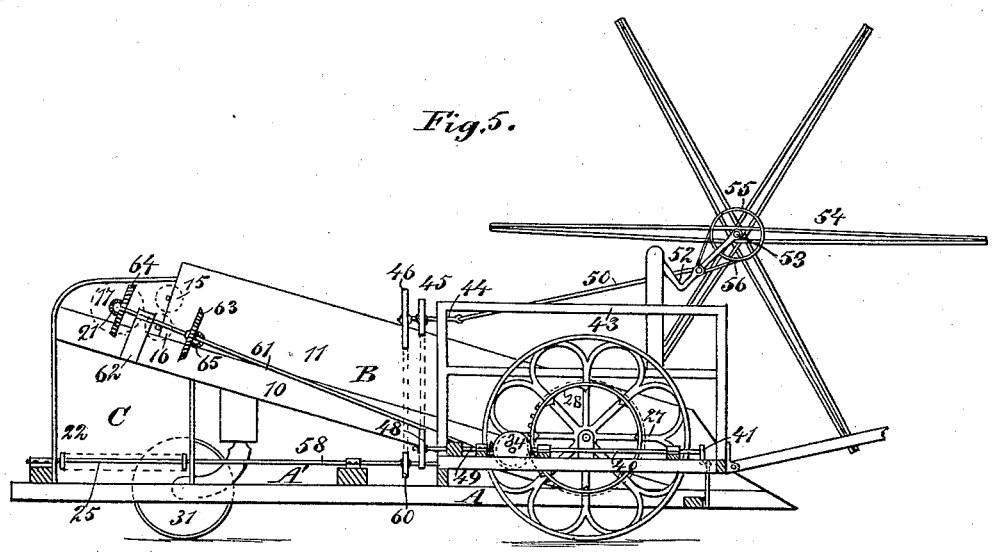

Figure 1 is an elevation of the left-hand side of the harvester. Fig. 2 is a plan view. Fig. 3 is a section taken practically on the line 3 3 of Fig. 2. Fig. 4 is a rear elevation, and Fig. 5 is an elevation of the right-hand side of the harvester with the rear conveyer removed.

This machine is intended to take the place and do the work of several machines now used in harvesting and chopping corn, oats, or other green fodder for ensilage. The present method of filling silos is to cut the fodder by means of a harvester or mower and then carry the fodder to a chopper located some distance away, which is driven by a steam-engine or by horse-power, and the said chopper cuts the fodder into required size and elevates it into the silo. This method has many disadvantages, and under the most favorable circumstances requires a large number of hands to handle the fodder.

The improved harvester is adapted to be drawn by horses or propelled by steam-power, the latter being preferred, and will harvest and chop the fodder and deliver the same into carts, from which it can at once be dumped into the silo. This work of chopping and harvesting is performed by the same machine, and while the work is in progress the finished material is delivered to a following receptacle. By this process the necessity of the major portion of the help now required is dispensed with, and the cost of filling silos is reduced to a minimum.

The main frame A of the harvester is rectangular, and is provided at its rear, at one side, with an extension A'. Cutting or harvesting knives of the usual pattern and common to harvesting and mowing machines are located upon the front of the main frame, at the left of its center. The knives are usually made from three to about five feet six inches in length, and are located at the bottom or foot of an upwardly-inclined conveyer B, which conveyer is supported upon the main frame and also upon the extension A' thereof, and the conveyer connects at its upper end with the upper portion of a cutting or chopping box or receptacle C, said receptacle being supported upon the rear portion of the frame-extension A'.

The conveyer consists of an essentially-rectangular skeleton base-frame 10, provided with upwardly-extending and preferably outwardly-flaring side boards 11. Within the frame 10, at its upper and lower ends, paralel shafts 12 and 13 are journaled, which shafts are adapted to carry an endless belt 14. Within the cutting or chopping box C, immediately behind the upper conveyer-shaft 12, two horizontal feed-rollers 15 and 16 are journaled, one above the other, the said rollers being adapted to grasp and carry the fodder brought upward by the conveyer to a series of cutting blades or knives 17. The cutting-blades are spirally arranged in a manner to form an open cylinder, as shown in dotted lines in Fig. 2, and the knives or blades are bolted and held in proper position by circular straps 18 or their equivalents.

The lower feed-roller is connected with the upper conveyer-shaft by means of a belt 19, and the upper feed-roller is connected with the knives by a belt 20 passed over suitable pulleys, one located upon a trunnion of the feed-roller and the other upon a trunnion of the united knives, the opposite trunnion of the knives being provided with a pinion 21.

An inclined chute 22 is located in the chopping box or receptacle attached at its upper end to the left-hand side of the box, just below the knife-cylinder, and carried downward and outward through the right-hand side of the box, near the bottom thereof, as shown in Fig. 4. The projecting end of the chute extends to within a short distance of an endless belt or apron 23, forming a portion of a second and rear conveyer D, said conveyer being secured upon the frame-extension A' at its right-hand side and extending upward and outward from said side, as is likewise shown in Fig. 4. The conveyer is placed in this position to permit of a cart being driven beneath it, as the purpose of the rear conveyer is to deliver the chopped feed to a vehicle following the harvester, by which means it may be transported to the silo. The endless belt or apron 23 is carried by an upper and lower shaft 24 and 25, journaled in the frame of the conveyer.

At the right-hand side of the center of the main frame A a drive-wheel 26 is journaled, which wheel also serves as a supporting-wheel. The wheel is preferably provided with a central web 27, and upon the axle to which the wheel is secured, at each side of the web, spur-wheels are secured, said wheels being numbered, respectively, 28 and 29. The spur-wheels are, as will be seen in Fig. 2, contained within the drive-wheel.

As a further support for the machine, a small wheel 30 is journaled upon a spud-axle located at the left-hand side of the main frame and a caster-wheel 31 is placed beneath the upper portion of the front conveyer.

The spur-wheel 28 is engaged by a pinion 32, fast upon a shaft 33, journaled at the right-hand side of the frame, which shaft is also provided with an attached bevel-gear 34. The spur-wheel 29 meshes with a pinion 35, fast upon a shaft 36, journaled upon suitable brace-bars 37 and 38 at the left-hand side of the driving-wheel 26, as is shown in Fig. 2, the said shaft 36 being also provided with a bevel-pinion 39.

A shaft 40 is journaled in the main frame at a right angle to the shaft 33, and is provided with a bevel-pinion at one end meshing with the bevel-gear 34 and a crank 41 at its opposite end, and through the medium of the crank and a pitman 42 connected therewith the harvester-knives are actuated.

An upright framing 43 is erected upon the main frame around the drive-wheel 26, and near the top of the framing, at its rear inner face, a horizontal shaft 44 is journaled and preferably provided with two pulleys 45 and 46, and the shaft 44 is driven by a belt 47 passing over the pulley 45, and a pulley 48 upon a shaft 49 journaled in the main frame and having an attached pinion meshing with the gear 34 of the short shaft 33. One end of a shaft 50 is pivotally connected with the inner end of the shaft 44, the opposite end of said shaft 50 being provided with a pinion 51 and being journaled in a bracket 52, fast to the front upper portion of the framing, as is illustrated in Figs. 2 and 3.

In the front portion of the bracket 52 a reel-shaft 53 is journaled, the reel 54, carried by the shaft, being of any approved construction and adapted to feed the standing grain to the harvester-knives. The reel-shaft within the bracket 52 has a pulley 55 secured thereon, connected by a belt 56 with a small pulley 57, provided with a beveled face, and meshing with the pinion 51, as shown in Figs. 1 and 2, the small pulley being journaled upon an arm of the bracket.

A line-shaft 58 is journaled at one of its ends in the framing 43, and the opposite end of the shaft is journaled in the bottom of the rear conveyer D and carries the roller over which the conveyer-apron passes, as shown in Fig. 1. This shaft is driven by a belt 59 passed over a pulley 60 upon the shaft and over the pulley 46 of the framing-shaft 44.

The endless belt of the front conveyer B and the cylinder of knives 17 are driven through the medium of a diagonal shaft 61, located at the right-hand side of the conveyer and journaled at its lower end in the main frame A and at its upper end in a hanger 62, attached, preferably, to the chopping box or receptacle C. The diagonal shaft is provided with two beveled or crown wheels 64 and 63, which mesh, respectively, with the pinion 21 of the knife-cylinder trunnion and a pinion 65 upon the upper shaft 12 of the conveyer.

It will be observed that all the mechanism is driven from the wheel 26, and it is evident that by disengaging the pinions of the shafts 33 and 36 from the gears 28 and 29, carried by the supporting-wheel 26, both conveyers will be silenced, likewise the chopping and harvesting knives and the reel. The disengagement may be effected in any suitable or approved manner.

In operation as the implement is driven forward the reel directs the standing grain to the harvester-knives, which cut the grain, and when cut the grain falls upon the endless apron of the front conveyer B and is carried by the said apron upward to the chopping box or receptacle to an engagement with the feed-rolls therein, which rolls direct the grain to the cylinder of knives, which chops it into suitable lengths, and when chopped the grain falls down upon the inclined chute in the chopping-box and is directed by said chute to the traveling apron of the rear conveyer D, and said conveyer delivers the chopped material to a cart or other receptacle or vehicle located beneath the conveyer and traveling with the machine.

Having thus described my invention, I claim as new and desire to secure by Letters Patent—

1. In a harvester of the character described, the combination, with the harvesting-knives, of a conveyer located at the rear of the knives, a downwardly-extending chute located at the rear of the conveyer, revoluble knives located above the chute, and a second conveyer located at the bottom of the chute, as and for the purpose specified.

2. In a harvester of the character described, the combination, with the driving mechanism thereof and the harvester-knives, of a conveyer located immediately at the rear of the knives, a downwardly-extending chute located at the rear of the conveyer, revoluble knives spirally arranged and journaled above the chute, a second conveyer located at the base of the chute, and a driving connection between the driving mechanism of the harvester, the conveyer-shafts, and the knife-shafts, as and for the purpose specified.

3. In a harvester of the character described, the combination, with the drive-wheel thereof, the harvester-knives, and a reel located above the knives, of a conveyer located immediately back of the knives and extending upwardly and rearwardly, a chute located at the rear of the conveyer, inclined from the top in direction of one side of the machine, revoluble knives journaled above the chute, a conveyer located at the base of the chute, and a driving mechanism connected with the conveyer-shafts and the knife-shaft and also with the drive-wheel of the harvester, as specified.

4. In a harvester of the character described, the combination, with the drive-wheel thereof and the harvester-knives, of a conveyer located immediately at the rear of the knives, a chute located at the back of the conveyer and connected therewith, revoluble knives journaled above the chute, feed-rollers journaled between the chute and the conveyer, and a second conveyer located at the base of the chute, and a driving connection between the drive-wheel of the harvester, the conveyers, the knives, and the feed-rollers, as and for the purpose set forth.

WILLIAM J. CONROY.

Witnesses:
R. A. STANS,
J. M. McDOUGALL.